(No Model.)
J. BAKER.
PROCESS KETTLE FOR COOKING CANNED FRUIT.
No. 300,554. Patented June 17, 1884.
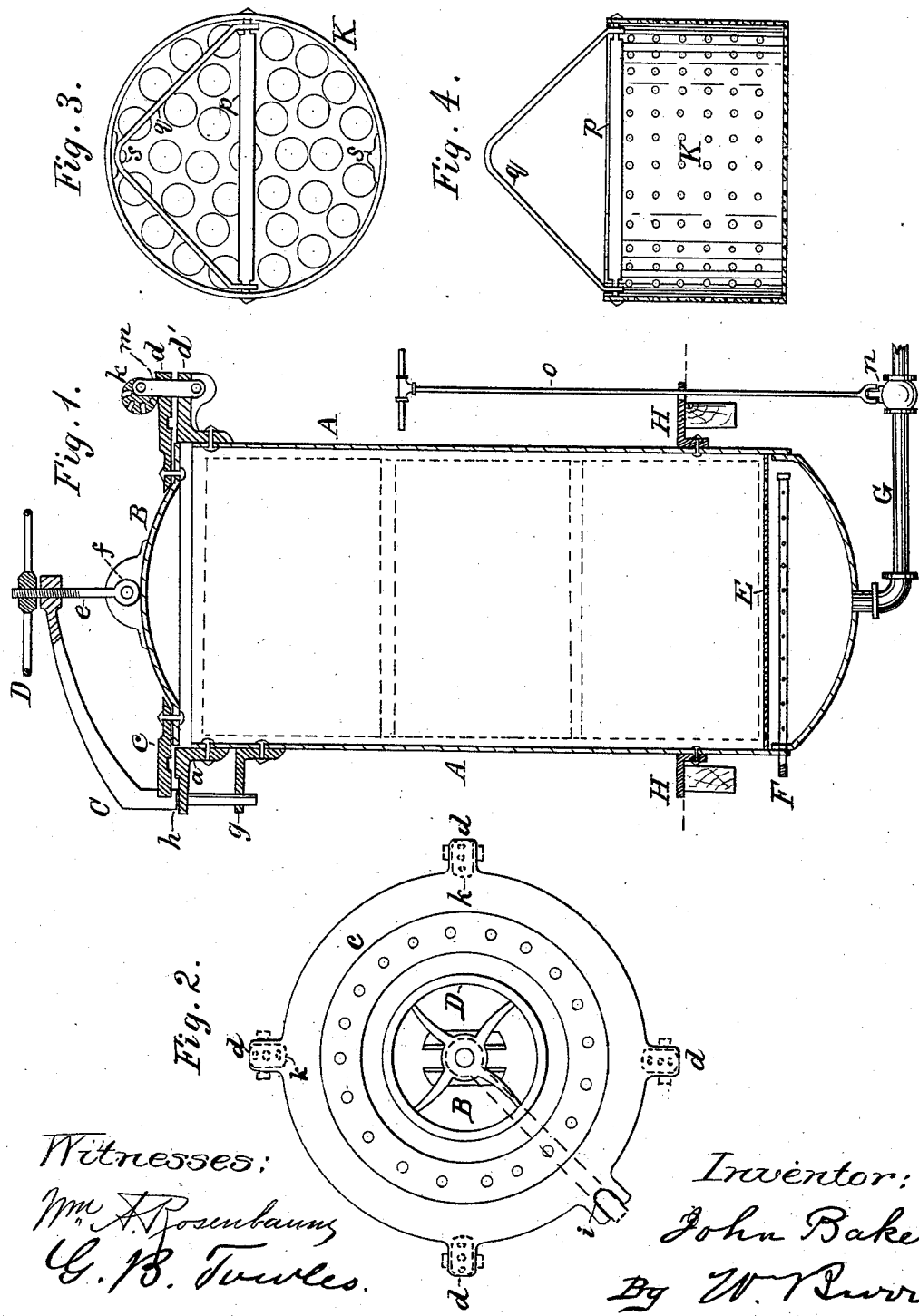
Witnesses:
Wm. A. Rosenbaum
G. B. Towles
Inventor:
John Baker
By W. Burris
Attorney

UNITED STATES PATENT OFFICE.

JOHN BAKER, OF MUSCATINE, IOWA.

PROCESS-KETTLE FOR COOKING CANNED FRUIT.

SPECIFICATION forming part of Letters Patent No. 300,554, dated June 17, 1884.

Application filed October 22, 1883. (No model.)

*To all whom it may concern:*

Be it known that I, JOHN BAKER, a citizen of the United States of America, residing at Muscatine, in the county of Muscatine and State of Iowa, have invented certain new and useful Improvements in Upright Process-Kettles Used in Cooking Canned Fruit and other Canned Articles, of which the following is a specification, reference being had therein to the accompanying drawings.

This invention consists in certain improvements in the construction of upright process-kettles used in cooking canned fruit and other canned articles, as hereinafter fully set forth.

In the accompanying drawings, Figure 1 is a vertical central section of a process-kettle having my improvements. Fig. 2 is a top view of the same. Fig. 3 is a plan of one of the trays in which the filled cans are placed. Fig. 4 is a vertical section of one of the trays.

A represents the body of the kettle, cylindrical in form, and constructed, usually, of wrought-iron, with a rim, $a$, secured to the top.

B is the detachable head or cover of the kettle, provided with an iron rim, $c$, secured thereto and having lugs $d$ on its periphery, as seen in Fig. 2. A vertical screw-bolt, $e$, has a pivotal connection at $f$ with the head B, and extends upward through an aperture in the arm of a crane, C, the stock of which extends into a bracket, $g$, fastened to the side of the kettle. The crane is provided with a shoulder, $h$, which has bearing on the rim $a$. It is also braced by the rim $c$, which has a recess at $i$ to receive the stock of the crane. A threaded hand-wheel, D, is placed on the screw-rod $e$, above the arm of the crane, for the purpose of raising the cover B as desired. The rim $a$, secured to the kettle, has on its periphery lugs $d'$, corresponding in position with the lugs $d$ on rim $c$. The lugs $d'$ are each connected with an eccentric roller, $k$, by means of a link, $m$, and when the kettle is closed the links are turned up over the projections or lugs $d$ of rim $c$, and the eccentric is turned by means of a hand-bar inserted in a hole in the eccentric until the head B is tightly secured.

The kettle is provided with a perforated false bottom, E, secured therein as shown.

F is a supply-pipe for steam or water, the same entering the kettle below the false bottom E, the pipe being closed at its inner end, and that part of it which extends into the kettle being perforated for the distribution of steam or hot water.

G is a blow-off pipe leading from the bottom of the kettle, and having a stop-cock, $n$, with a handle, $o$, extending upward, so that the cock may be operated from above.

H are brackets secured to the kettle, and when the latter is set in position the brackets rest on the timbers of a floor, the lower end of the kettle extending below the floor.

K is one of the trays for containing the cans of fruit or other articles of food, the same being constructed of perforated sheet metal, provided with a rim secured to the open top, across which extends a cross-bar, $p$, which braces the tray. The handle $q$ of the tray is pivotally connected with the bar $p$, so that it may be laid down or raised, as desired, as shown. Three trays of cans are usually employed to fill the process-kettle, as indicated by dotted lines in Fig. 1. The rests $s$, which are fastened on the inside near the top of the trays, are designed to support the bail turned down in position to be readily reached when required for handling the trays, and to allow them to be placed one upon another in the kettle.

When it is desired to open the kettle for removing the contents, the links $m$ are loosened and turned off the projections $d$ of head B, and the head is raised by turning wheel D on screw-bolt $e$, when the crane C is swung around, thus removing the head B entirely from the top of the kettle, and the trays containing the cans may be lifted out.

In this application I do not claim the construction and combination of the devices which are shown and claimed in my pending application No. 109,888, filed October 24, 1883, for a process-kettle.

I claim as my invention—

1. The combination, with the upright kettle A, having the bracket $g$ and rim $a$, of the removable cover B, provided with the rim $c$, having the recess $i$, the crane C, provided with the bearing-shoulder $h$, and extending through the rim $a$ and bracket $g$, the threaded wheel D, and the screw-rod $e$, having pivotal connection with the cover B, substantially as and for the purposes described.

2. The combination, with the upright kettle A, provided with the rim $a$, lugs $d'$, and bracket $g$, of the removable cover B, provided with the rim $c$ and lugs $d$, the crane C, and the threaded rod $e$, extended through the end of the crane and provided with the wheel D, and having pivotal connection with the cover, the eccentrics $k$, and links $m$, having pivotal connection with the lugs $d'$, substantially as and for the purposes described.

3. In an upright kettle, the perforated trays K, each provided with a bar, $p$, rest $s$, and bail $q$, pivoted to the bar and constructed to be turned down upon the rest within the tray in position to allow the trays to be placed one above another in the kettle, and in position for the bails to be readily accessible in removing the trays from the kettle, substantially as and for the purposes described.

In testimony whereof I affix my signature in presence of two witnesses.

JOHN BAKER.

Witnesses:
  CHAS. PAGE,
  C. A. WELTZ.